(12) United States Patent
Bott et al.

(10) Patent No.: US 7,692,356 B2
(45) Date of Patent: Apr. 6, 2010

(54) ELECTRIC MACHINE WITH A CIRCUIT SUPPORT

(75) Inventors: Erich Bott, Hollstadt (DE); Michael Bzdziuch, Bad Königshofen (DE); Hubertus Bähr, Bad Königshofen (DE); Rainer Eckert, Bad Neustadt/Herschfeld (DE); Axel Knauff, Münnerstadt (DE); Jürgen Pawellek, Unsleben (DE); Reiner Seufert, Salz (DE); Uwe Zimmermann, Bischofsheim (DE); Michael Zisler, Euerdorf-Wirmsthal (DE)

(73) Assignee: Siemens Aktiengesellschaft, München (DE)

( * ) Notice: Subject to any disclaimer, the term of this patent is extended or adjusted under 35 U.S.C. 154(b) by 124 days.

(21) Appl. No.: 10/561,621

(22) PCT Filed: Jun. 17, 2004

(86) PCT No.: PCT/EP2004/006561

§ 371 (c)(1),
(2), (4) Date: Jan. 24, 2007

(87) PCT Pub. No.: WO2004/114502

PCT Pub. Date: Dec. 29, 2004

(65) Prior Publication Data

US 2007/0170792 A1    Jul. 26, 2007

(30) Foreign Application Priority Data

Jun. 20, 2003  (DE)  ............................... 103 27 960
Jun. 4, 2004   (DE)  ....................... 10 2004 027 380

(51) Int. Cl.
*H02K 11/00* (2006.01)

(52) U.S. Cl. .......................... 310/260; 310/270; 310/71

(58) Field of Classification Search ................. 310/260, 310/270, 71
See application file for complete search history.

(56) References Cited

U.S. PATENT DOCUMENTS

| 3,151,260 A   | 9/1964  | MacCracke, Jr. et al. |
| 3,495,109 A * | 2/1970  | Ames ........................... 310/71 |
| 3,984,712 A * | 10/1976 | Hill .............................. 310/71 |
| 4,039,875 A * | 8/1977  | Morreale ..................... 310/194 |
| 4,096,625 A * | 6/1978  | Morreale ..................... 29/596 |
| 4,224,543 A * | 9/1980  | Morreale ..................... 310/71 |
| 4,287,446 A * | 9/1981  | Lill et al. ...................... 310/71 |
| 4,490,636 A * | 12/1984 | McBratney ................... 310/71 |
| 4,645,961 A * | 2/1987  | Malsky ................... 310/156.07 |
| 4,689,023 A * | 8/1987  | Strong et al. ................ 439/189 |
| 4,847,527 A * | 7/1989  | Dohogne .................... 310/218 |

(Continued)

FOREIGN PATENT DOCUMENTS

DE    15 88 986    1/1971

(Continued)

*Primary Examiner*—Quyen Leung
*Assistant Examiner*—Naishadh N Desai
(74) *Attorney, Agent, or Firm*—Henry M. Feiereisen; Ursula B. Day

(57) ABSTRACT

The invention relates to an electric machine (1) comprising a stator (21) and a rotor. The stator (21) includes at least one winding system having a plurality of coils (2) wherein start and end of the corresponding coils (21) is fixed on an end face of the stator (21) by means of a circuit support (7) and contacted in such a manner as to obtain predeterminable connections of the coils (2).

21 Claims, 11 Drawing Sheets

U.S. PATENT DOCUMENTS

| | | | |
|---|---|---|---|
| 5,717,273 A * | 2/1998 | Gulbrandson et al. | 310/260 |
| 5,739,603 A * | 4/1998 | Darceot | 310/71 |
| 5,900,687 A * | 5/1999 | Kondo et al. | 310/71 |
| 6,100,614 A * | 8/2000 | Lin | 310/71 |
| 6,333,579 B1 * | 12/2001 | Hirano et al. | 310/194 |
| 6,566,779 B2 * | 5/2003 | Takano et al. | 310/214 |
| 6,583,529 B2 * | 6/2003 | Suzuki et al. | 310/199 |
| 6,600,244 B2 * | 7/2003 | Okazaki et al. | 310/71 |
| 6,710,475 B2 * | 3/2004 | Nishida et al. | 310/254 |
| 6,838,804 B2 * | 1/2005 | Mimura | 310/260 |
| 6,847,146 B2 * | 1/2005 | Hessenberger et al. | 310/179 |
| 6,888,284 B2 * | 5/2005 | Eggers et al. | 310/218 |
| 6,924,570 B2 * | 8/2005 | De Filippis et al. | 310/71 |
| 6,949,848 B2 * | 9/2005 | Yamada et al. | 310/71 |

FOREIGN PATENT DOCUMENTS

| | | |
|---|---|---|
| DE | 23 52 946 | 4/1975 |
| DE | 198 57 954 | 6/2000 |
| EP | 0 863 601 | 9/1998 |
| EP | 1 191 665 | 3/2002 |
| EP | 1 193 829 | 4/2002 |
| GB | 1 586 227 | 3/1981 |
| GB | 2 333 647 | 7/1999 |
| JP | 6 233483 A | 8/1994 |
| JP | 06225491 | 8/1994 |
| JP | 09285056 | 8/1996 |
| JP | 2000 014069 A | 1/2000 |
| JP | 2000 245093 A | 9/2000 |
| JP | 2000 333400 A | 11/2000 |
| JP | 2002 058228 A | 2/2002 |
| JP | 2002 300745 A | 10/2002 |
| JP | 2002 325405 A | 11/2002 |
| WO | WO 2004/008610 | 1/2004 |

* cited by examiner

ELECTRIC MACHINE WITH A CIRCUIT SUPPORT

BACKGROUND OF THE INVENTION

The invention relates to an electric machine with a stator and a rotor, wherein the stator includes at least one winding system having a plurality of coils, with a winding head disposed on both end faces of the stator, wherein a start and an end of the respective coils are located on an end face of the stator.

At least in the stator electric machines include a winding system to be interconnected at least in an end section of the electric machine. The winding ends of the individual coils in the winding system are interconnected by manual welding or soldering. Insulating tubes are pushed over the welded or soldered joints. These insulated interconnections are then attached to nearby components by cable ties.

DE 15 88 986 discloses attachment of sections of the winding systems, in particular of the winding heads. This document describes a holder for winding strands of an electric machine, wherein the winding strands are held together by a component having fingers, with the fingers also holding the connecting wires.

In addition, DE 23 52 946 describes a stator for induction machines, wherein the winding heads of the exciter winding which protrude on both sides of the stator laminate are each enclosed by a tight-fitting, molded part which is pressed on. The molded part consists of an insulating lattice structure, whereby pockets are provided around the periphery of the insulating lattice structure of the molded parts for receiving the terminal ends of the winding strands which are connected by soldering, welding or crimped sleeves.

These conventional arrangements have the disadvantage that, although the winding ends or the winding heads are secured, the winding ends themselves may not be properly routed or reliably interconnected.

SUMMARY OF THE INVENTION

It is therefore an object of the invention to provide an electric machine wherein mistakes in interconnecting the windings can be readily prevented, while also simplifying the assembly process for interconnecting the wires and the final assembly of the electric machine.

The above object is solved by an electric machine with a stator and a rotor, wherein the stator has at least one winding system formed of several coils, with a winding head on both end faces of the stator, wherein a start and an end of the respective coils are located on an end face of the stator and are secured by at least one circuit support and contacted so as to obtain predetermined interconnections of the coils.

The above object can also be solved by a method for producing an electric machine with a stator and a rotor, with the following steps:

packing the lamination of the stator and/or the rotor by stamping,
inserting a winding system into slots of the stator and/or rotor,
contacting the start and end of the respective winding strands,
interconnecting the winding system by the circuit support according to the invention.

Interconnecting the winding strands, i.e., the start and ends of the respective coils, can be simplified considerably by using a circuit support according to the invention, which also can be referred to as a support device and which is placed on an end face of the stator. The winding strands to be interconnected protrude into the region where the electric interconnections are made through defined, associated openings or recesses in the circuit support. Printed conductor tracks or channels corresponding to the interconnection eliminate the risk of mistakes when interconnecting the winding strands.

Circuit supports of this type are particularly advantageous when the winding system is constructed of toothed coils, which can further simplify the final assembly of the electric machine. When using a split stator, the toothed coils are pushed from the outside on the prefabricated stamped sheet metal laminate, and onto the corresponding teeth radially from the inside, where the toothed coils are secured on the respective tooth by mechanical or material connections.

The toothed coils can be easily manufactured by advantageously placing them on supports, thus further simplifying the final assembly of the electric machine.

The circuit supports are then positioned axially on the intended end face of the stator. The winding strands, i.e., start and end of the corresponding coil, are routed in predefined recesses and openings of the circuit support, where they are secured and optionally contacted, for example, by insulation displacement connections. Prefabricated conductor tracks on the circuit support, which in this embodiment can be implemented as a printed circuit board, can also provide direct interconnections. The maximum current carrying capacity of the conductor tracks is defined by their smallest cross-section, i.e., their resistance. Preferably, the conductor tracks are made as wide as possible which, although not increasing the current carrying capacity, improves the heat transfer to the surroundings and therefore increases the electric load-carrying capacity. The heat dissipated in the coils can also be removed across the larger surface area of the conductor tracks.

The printed circuit board is attached to the laminate or to at least several supports of the toothed coils. This can be accomplished by snap-in components, hooks or cable binders. Optionally, the wires can still be more securely attached by impregnating them with a resin.

In another embodiment, the winding strands are manually interconnected within the channels by soldering or welding.

In another embodiment, the supports of the toothed coils have predefined features for contacting the winding strands and the circuit supports. The start of a winding strand is inserted, for example, in an electrically conducting insulation displacement contact. The toothed coil is wound. The end of the winding strand is inserted into the other insulation displacement contact of the support. These insulation displacement contacts are electrically connected, for example, by contact pins located on the end faces of the support. When the supports are mounted on a stator, all contact pins point in the axial direction toward the circuit support, which only needs to have the corresponding mating contacts to interconnect the toothed coils.

The circuit support is advantageously snapped onto at least several supports of the toothed coils or, if no supports are provided, is secured directly to the toothed coils. The circuit support can also be attached on the stator laminate by, for example, detents or similar connecting means.

The circuit support thus has several functional elements for attaching, contacting, and muting the wires of current-carrying components.

Advantageously, the circuit support can be implemented as a single piece, i.e., the entire functional elements and the circuit support can be constructed of a single injection-molded part.

The circuit support can also be constructed as a basic frame to which optional components are connected, for example through snap-on connections, to attach, contact, and route the wires of current-carrying components. These functional elements can also be insulation displacement contacts, latching metallic conductor tracks, pluggable cable channels, temperature sensors and the like.

More complex circuits for the winding system can be assembled by arranging several circuit supports consecutively in the axial direction, so that windings requiring even more complex interconnections can be connected error-free.

Alternatively, several superimposed contact arrangements can be constructed using conventional molding techniques, which only need to have free contact surfaces for the winding strands or contact pins. Accordingly, 3-D structures having both mechanical and electrical interconnections can be built. Such circuit supports can be implemented, for example, with MID technology (Molded Interconnected Devices). Conductor tracks can be printed on plastic components to simultaneously provide mechanical and electronic functions on injection molded parts or foils.

Circuit supports of this type can also be produced using lead frame technology, which encompasses extrusion-coating of flexible stamped conductors, conductor tracks, connectors and contacts.

Advantageously, the circuit support can include a snap-on or latching cover which not only lengthens the air and leakage paths and hence also increases the dielectric strength, but also holds of the interconnecting wires down. The cover has preferably webs which protrude into the channels of the circuit supports, thereby pressing the wires and the interconnections of the winding strands down. This lengthens the leakage paths of the webs on the circuit support and prevents arcing between the different phases. The depth of the webs in the cover is determined by the terminal voltage of the electric machine. Because the cover snaps on or latches, it cannot pop up, so that the respective webs remain in place.

The cover can be molded together with the circuit support to prevent the detents of the cover from breaking off under severe impacts or temperature variations.

The cover and/or the circuit support can also have peripheral walls to prevent arcing between a phase and the housing of the electric machine or an intermediate flange, and electrically insulate the rotor and the brake. The peripheral wall of the cover can have openings for routing the insulated terminal wires U, V, W.

BRIEF DESCRIPTION OF THE DRAWING

Examples and additional advantageous embodiments of the invention are schematically illustrated in greater detail in the drawings.

DETAILED DESCRIPTION OF PREFERRED EMBODIMENTS

Figure 1:
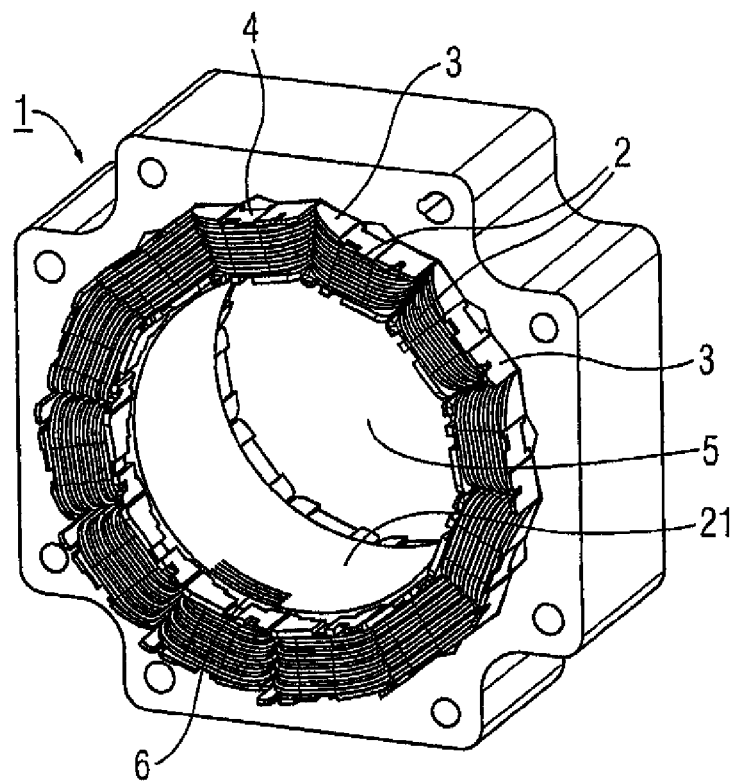
FIG. 1 shows an electric machine with a winding system,
FIG. 2, 4 show a circuit support in a perspective view.

FIG. 1 shows an electric machine 1 which can advantageously be a servo motor, a torque motor or a generator. The electric machine 1 includes a winding system which in the illustrated example is constructed of toothed coils 2. However, the circuit support arrangement according to the invention can also be used with other winding systems, for example fractional pitch windings, dual-layer windings, and the like.

Figure 18:
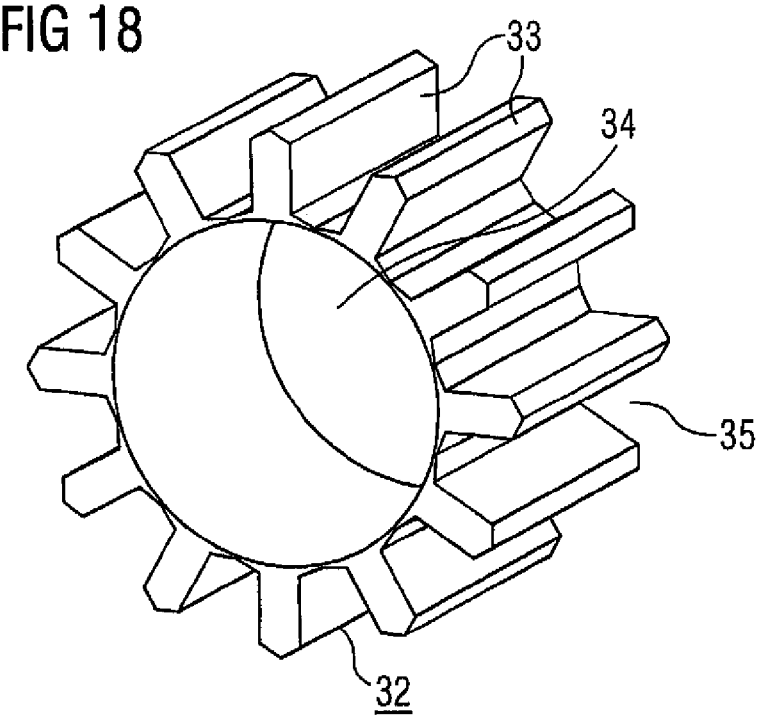
FIGS. 18, 19 show a split stator.
Figure 19:
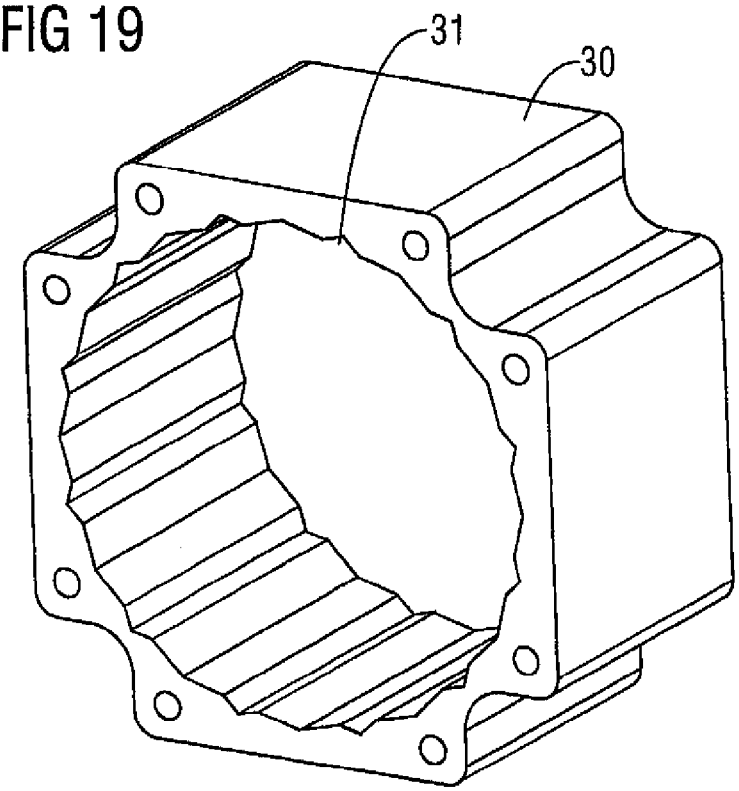

The toothed coils 2 are advantageously arranged on a support 3, so that the unit comprised of the toothed coil 2 and the support 3 can be preassembled and later needs only to be placed on the teeth 33 of stator 21 which form the slots 35. As seen in FIGS. 18 and 19, the stator is advantageously split in the axial direction, so that the toothed coil 2 of the support 3 can be placed on the corresponding tooth 33. The star 32 with the support 3 and the toothed coils 2 is then inserted in a matching opening 31 of a yoke 30, thereby forming the stator 21. Dovetail joints or other mechanical attachments can be employed.

The stator is formed of a sheet metal laminate 6, but can also be made of a sintered material.

The stator 21 can be made as a single piece, wherein the support 3 with the toothed coil 2 is inserted into the slots 35 from the side of the stator bore 34. The supports 3 can then engage with mating recesses disposed on the teeth 33 (not shown).

Advantageously, the support can be formed so that a circuit support 7 can optionally be snapped on in the axial direction. The snap-on connection can operate both as an electrical contact and as a mechanical connection.

Figure 2:
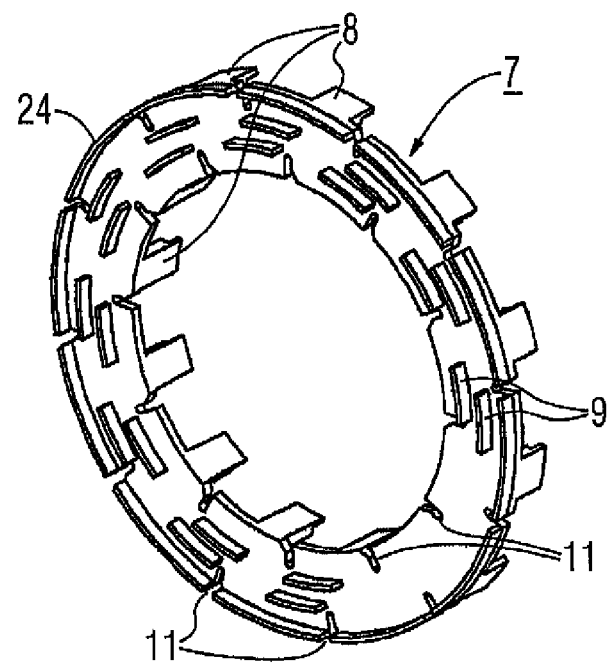

FIG. 2 shows a circuit support 7 in a perspective view. Both the outer and the inner circumference of the circuit support 7 include guiding elements 8 for guiding or attaching the circuit support 7 on at least several supports 3 or on the laminate of the stator 21 itself. The guiding elements 8 are implemented here as detents 4 and corresponding mating parts are disposed on the support 3. As seen in FIG. 2, three electrically conducting, separate conductor tracks 10 are arranged along the periphery of the circuit support 7 which is implemented as a printed circuit board. These conductor tracks 10, which are schematically illustrated in FIG. 3, are provided for contacting and interconnecting the winding strands 23 (see FIG. 13) which each form the end and the start of the toothed coils 2.

The conductor tracks 10 can be applied by chemical processes, MID-processes or lead frame processes. This obviates the need for manually interconnecting the individual winding strands 23 of the toothed coils 2. The circuit support 7 is located on the end face of the toothed coils 2. Recesses 11 in the circuit support 7, in particular in the printed circuit board, allow insertion of start and end of the winding strands 23. The top side and the bottom side, or an optional intermediate layer of the printed circuit board, are preferably connected during the soldering process via the side metallization of the recesses 11. The circuit support 7 can be attached to the supports 3 by cable ties or detents 4. This prevents movement of the circuit support 7 in the axial direction even under severe impact. Accurate alignment is ensured by forming the detents 4 with a suitable angle, which also prevents radial twisting. The circuit support 7 can be more securely attached by impregnation with a resin.

The webs 9 of the circuit support 7 lengthen the leakage paths between the individual phases U, V, W. The winding strands 23 are routed through the recesses 11 from the winding space of the toothed coils 2 to the respective connector tracks 10 or the channels 14, where they are contacted, for example, by plug-in connectors or solder joints.

Figure 3:
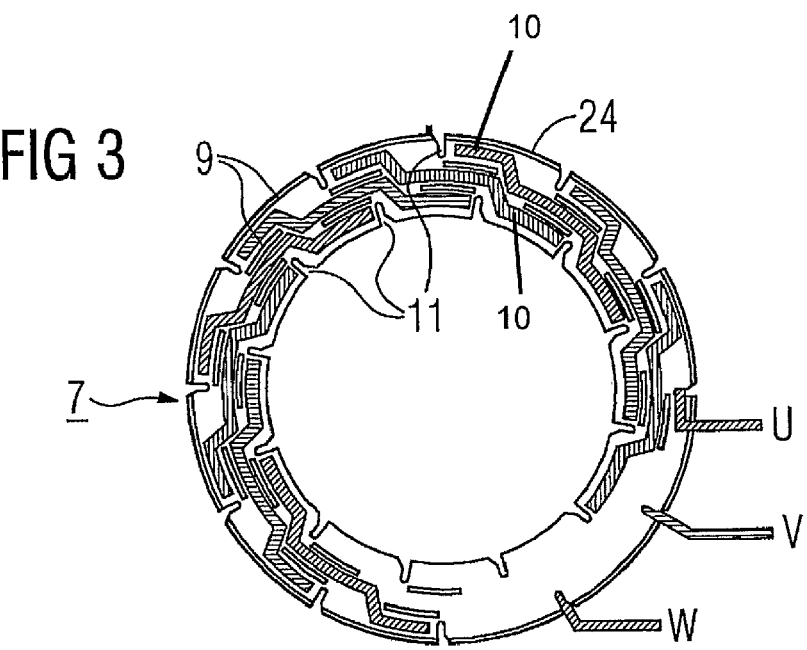
FIG. 3 shows a circuit support in a side view.

FIG. 3 shows a different view of the circuit support 7, emphasizing in particular the routing of the conductor tracks 10 and placement of the recesses 11 and the webs 9. The width of the conductor tracks 10 is maximized to provide adequate cooling.

Figure 4:
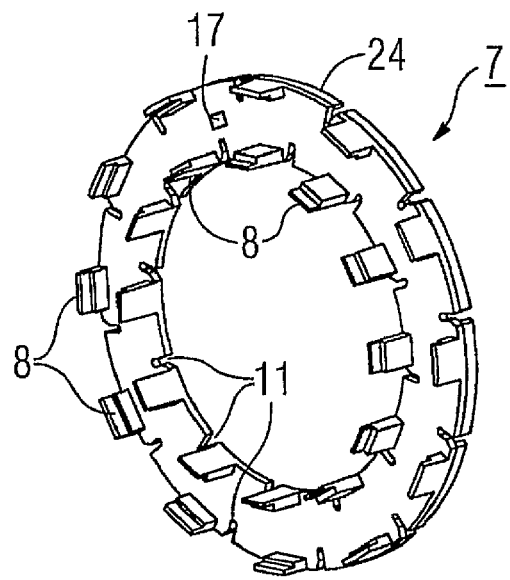

FIG. 4 shows the guiding elements 8 on the outer and inner circumference of the circuit support 7, which are placed on the end face of the stator 21. One or more temperature sensors 17 can be attached on the inside of the circuit support 7, in particular near hot spots.

Figure 5:
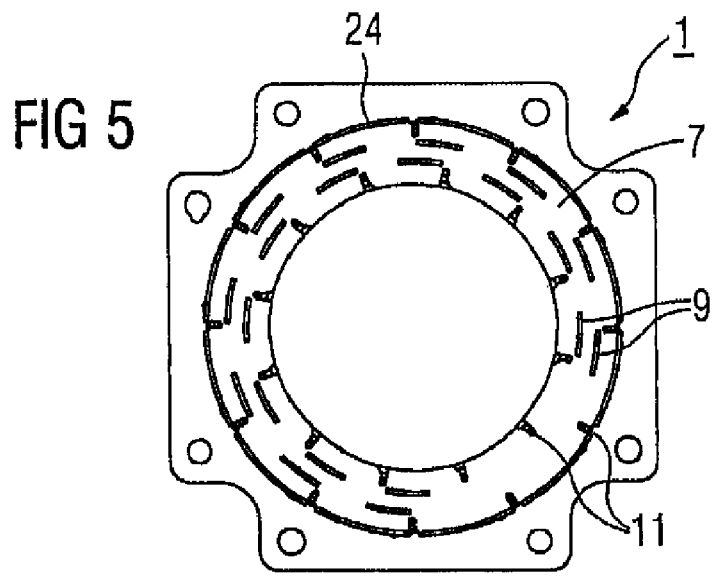
FIG. 5 shows a circuit support on an electric machine in a side view.

FIG. 5 shows the circuit support 7 in another view, wherein the circuit support 7 is attached and secured to the end face of the electric machine 1.

Figure 6:
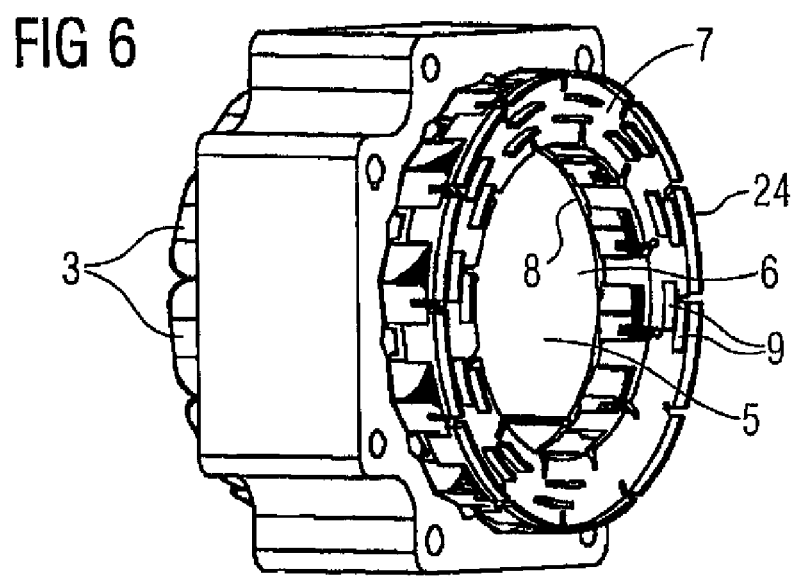
FIG. 6 shows a circuit support on an electric machine in a perspective view.

As shown in FIG. 6, the detents 4 engage with the support 3 of the toothed coils 2, wherein the winding strands 23 of the toothed coils 2 are routed to the corresponding conductor tracks 10 through the recesses 11.

Figure 7:
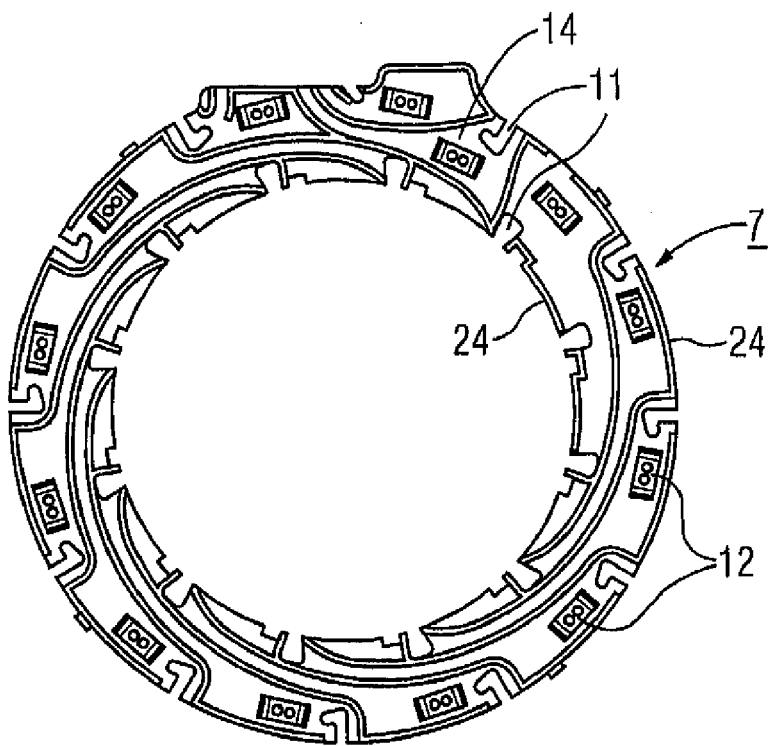
FIG. 7 shows another embodiment of a circuit support.

FIG. 7 shows another embodiment of the circuit support 7, wherein the winding strands of the toothed coils 2 protrude through recesses 11 into prefabricated, assigned channels 14, where they secure and interconnect the individual toothed coils 2 of a phase via insulation displacement contacts 12.

The insulation displacement contacts 12 can be prefabricated with the circuit support 7 as a single piece. Alternatively, the insulation displacement contacts 12 can engage through snap-on connections or be arranged on the circuit support 7 by way of riveted connections.

Figure 8:
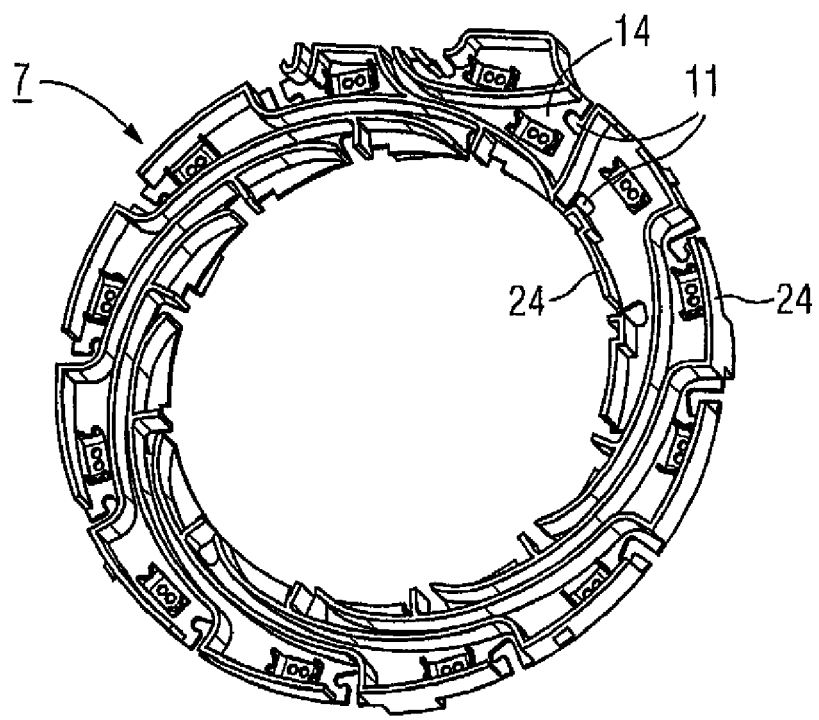
FIG. 8 shows a more detailed view of the circuit support.

FIG. 8 shows the circuit support 7 according to FIG. 7 in a different perspective view.

Figure 9:
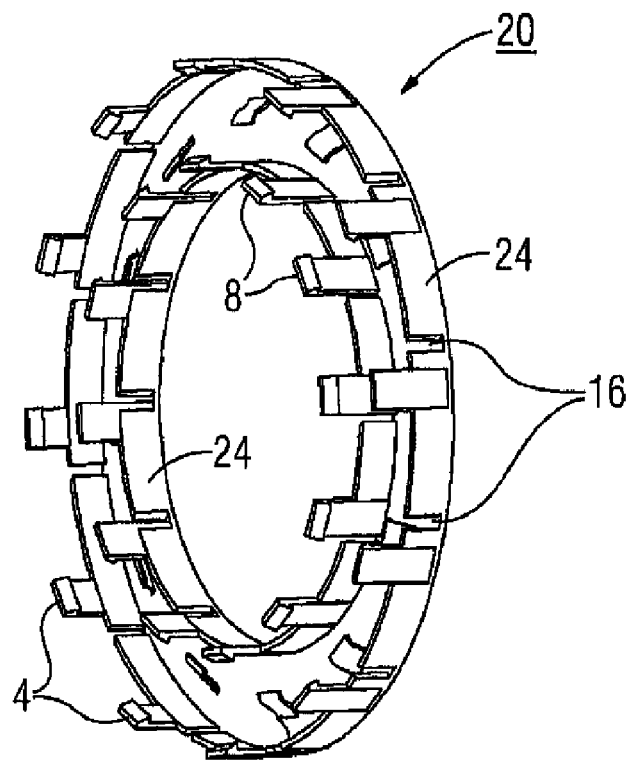
FIG. 9 shows a cover.

FIG. 9 shows a cover 20, which functions as a lid or protective cap. The cover 20 can also be snapped on the support 3 with its guiding elements 8. Preferably, the cover 20 has webs (not shown) which preferably protrude into the channels 14 of the circuit support 7, thereby depressing the winding strands 23 or the interconnections of these strands. This approach lengthens the leakage paths across the webs 9 of the circuit support 7 and prevents arcing between adjacent phases. The depth of the webs in the cover 20 is determined by the terminal voltage of the electric machine 1. Cable ties can be inserted into recesses 16 to more securely attach the cover 20 on the circuit support 7 and optionally also provide strain relief for the supply lines U, V, W. To lengthen the leakage paths to the housing or to a rotor, the circuit supports 7 also include walls 24 extending around the periphery of the covers 20. The walls 24 can optionally be interrupted by the recesses 11.

Figure 10:
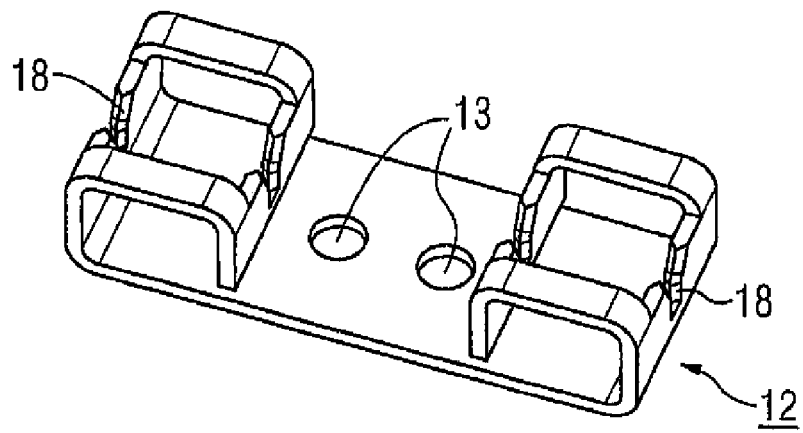
FIG. 10 shows an insulation displacement contact.

FIG. 10 shows in an enlarged view an insulation displacement contact 12 which can be positioned on a circuit support 7 by way of rivets 13. The insulation displacement contact 12 is constructed so that the winding strands 23 can be secured in the slots 18 which can accommodate different wire cross-sections.

Figure 11:
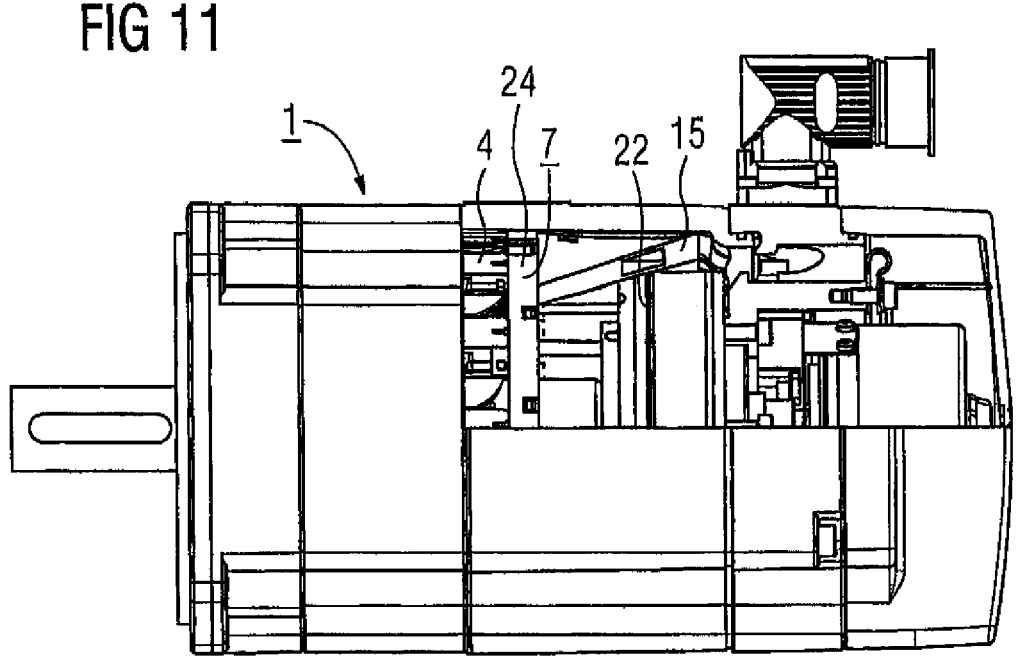
FIG. 11 shows a more detailed view of an electric machine in a longitudinal cross-section.

FIG. 11 shows an electric machine 1 in a longitudinal cross-section with a circuit support 7 and a brake 22 which is installed on the machine 1 in the axial direction. For routing wires and power cables safely along the moving part of the brake 22, a cable channel 15 which axially extends across the moving parts of the brake 22 can advantageously be installed on the circuit support 7, thereby preventing damage. The cable channel 15 can also be attached to the circuit support 7 by a snap-on connection. An outwardly facing slot extending over the axial length of the cable channel 15 facilitates insertion of the wires and cables.

Figure 12:
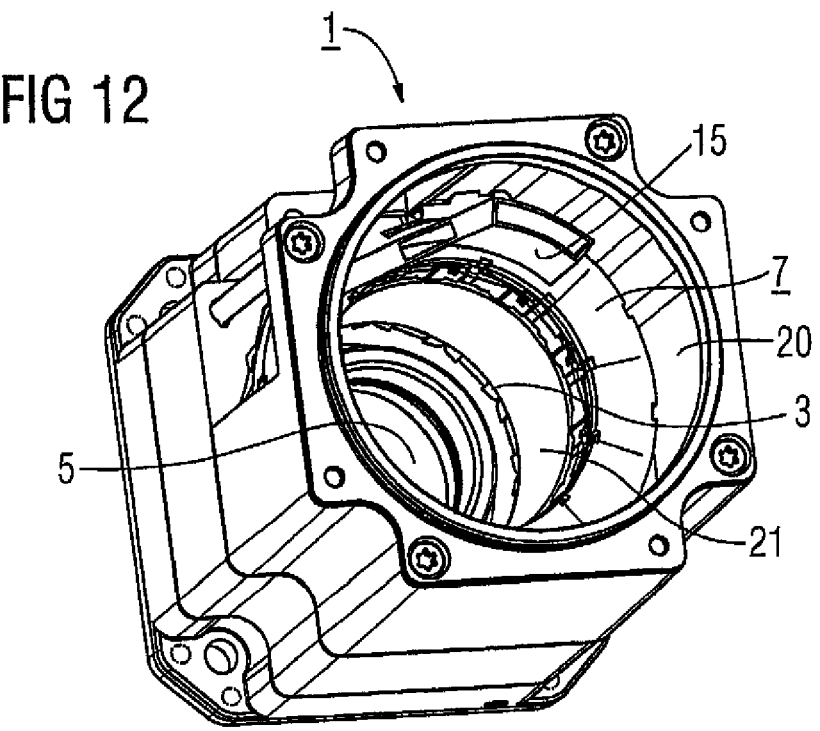
FIG. 12 shows a side view of a circuit support with a cable channel.

FIG. 12 shows a perspective view of the electric machine 1 with a circuit support 7 with a cover 20. The cable channel 15 is attached to the circuit support 7 and routes wires and cables past the electric machine 1, for example past the brake 22 (not shown in detail). The wires and cables are, in particular, power cables, transducer wires or signal wires for sensors. The wires and cables need not necessarily originate or terminate on the circuit support 7.

Figure 13:
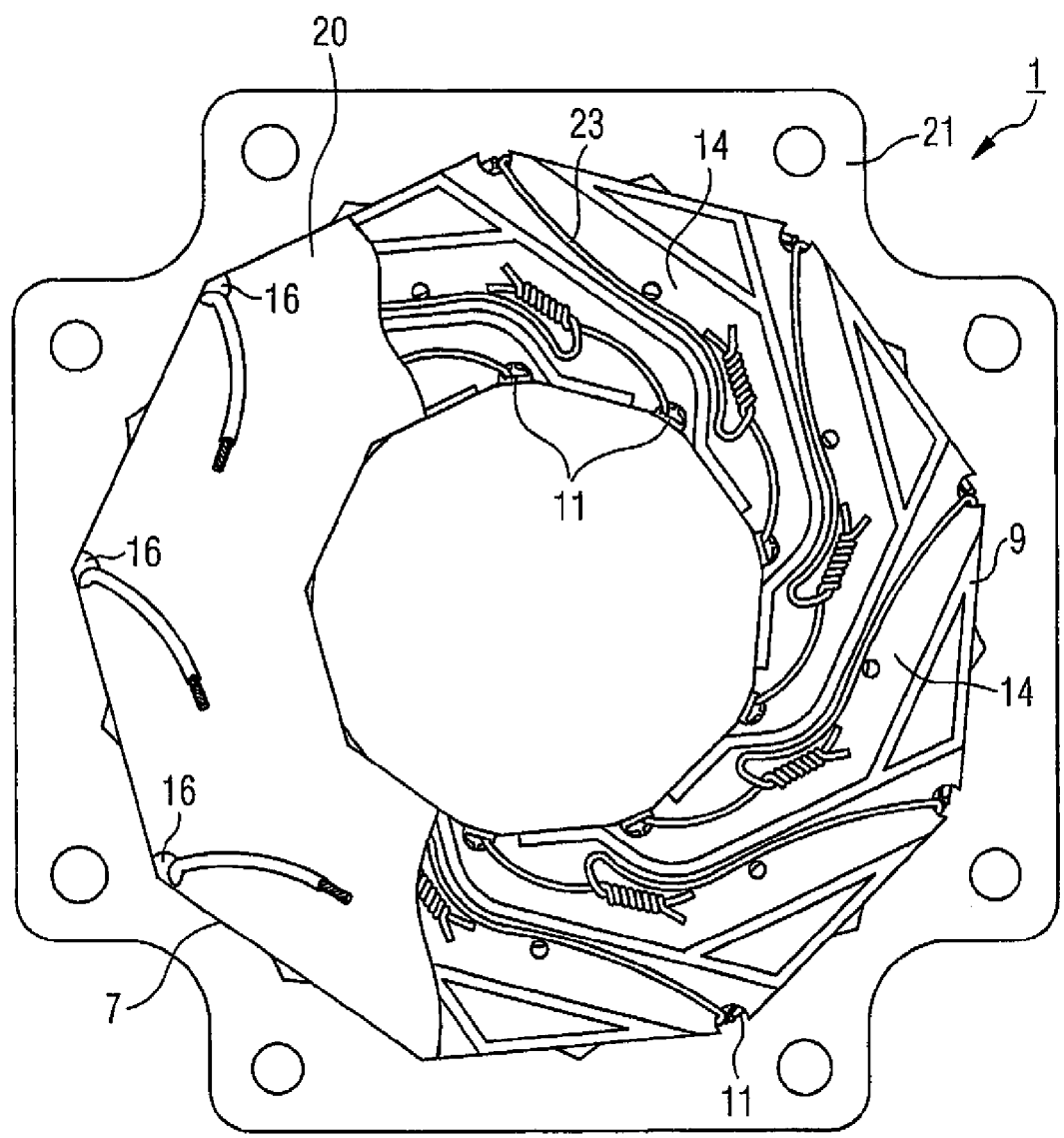
FIG. 13 shows another view of a circuit support on an electric machine.

FIG. 13 shows another embodiment of an electric machine 1 with a circuit support 7, wherein the winding strands 23, i.e., the start and end sections of the toothed coils, are routed through the recesses 11 and interconnected in the channels 14.

Figure 14:
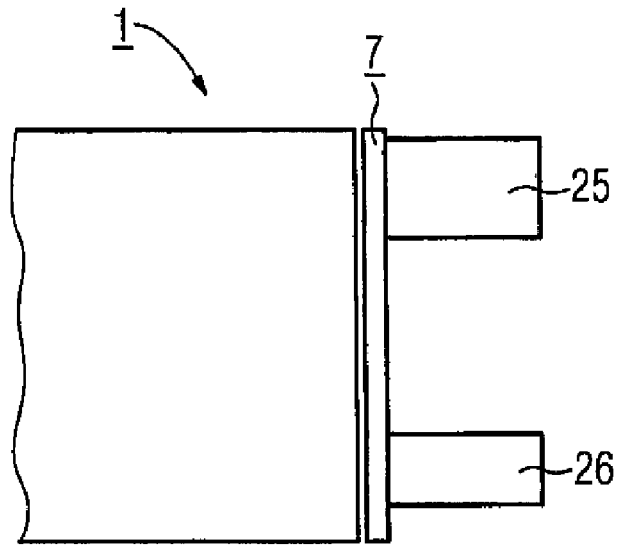
FIGS. 14, 15 show a schematic diagram of functional elements on the circuit support.
Figure 15:
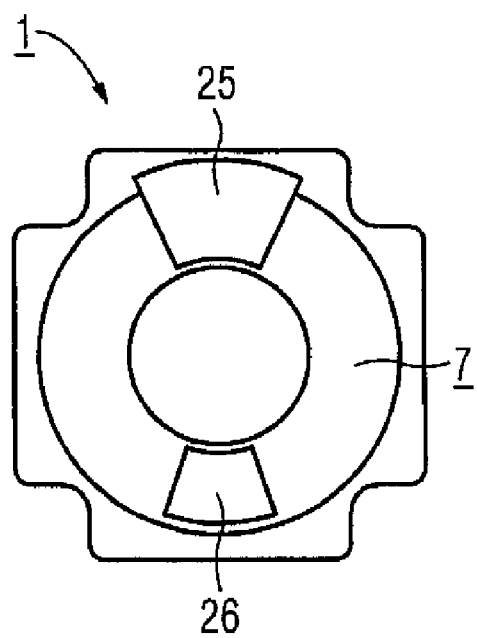

FIGS. 14 and 15 show different views of a general placement of additional functional elements on the circuit support 7, for example a converter 25 or a controller 26. These elements are placed, in particular, on the circuit support 7 in the axial direction, where they are electrically contacted via plug connectors or solder joints. The wires are preferably also routed through the cable channel 15.

Moreover, cooling fins can be attached to the circuit support 7, which are either connected to the circuit support 7 as a single unit or can be slipped on, in particular onto the conductor tracks 10, to more effectively transfer the dissipated heat.

Figure 16:
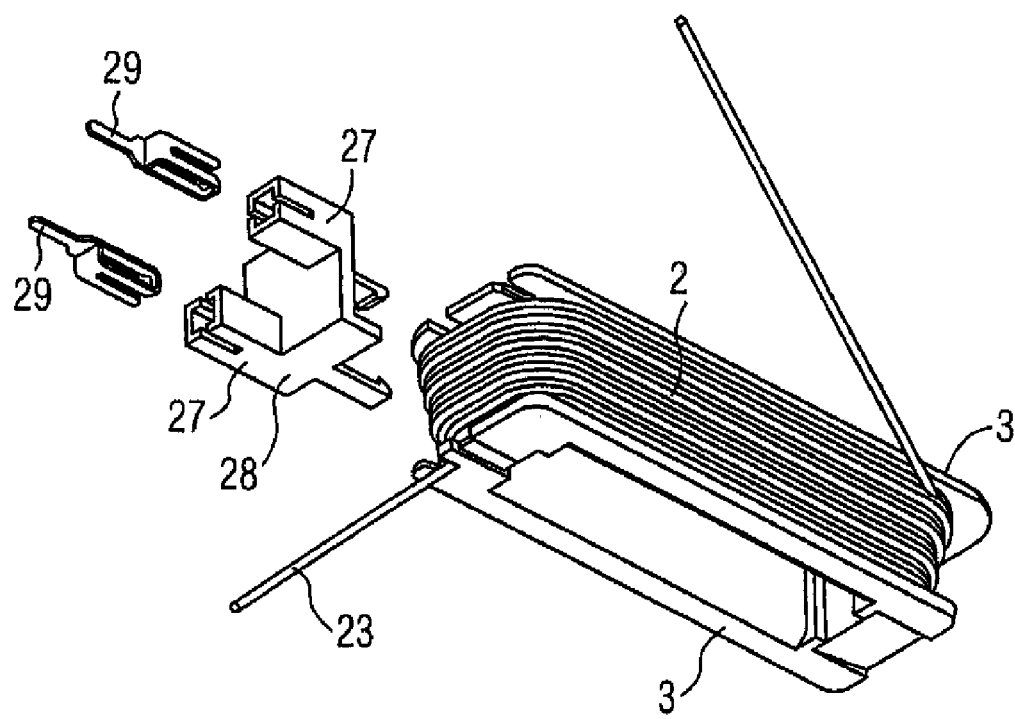
FIGS. 16, 17 show a toothed coil with contact system.
Figure 17:
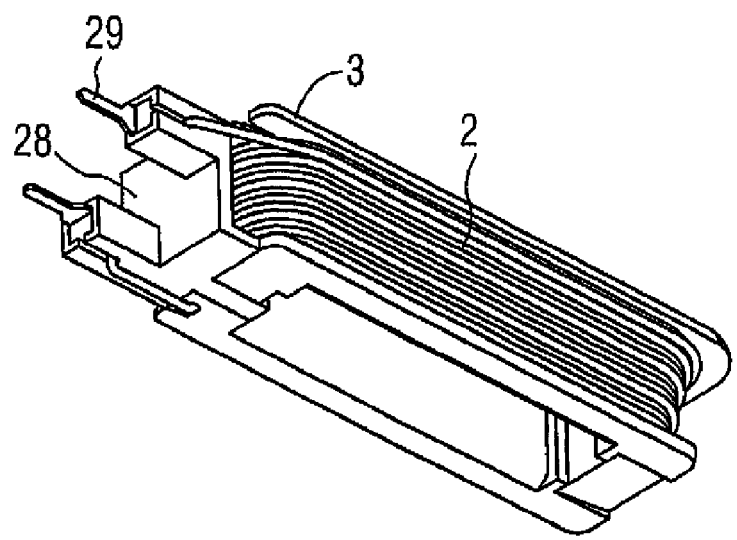
Figure 20:
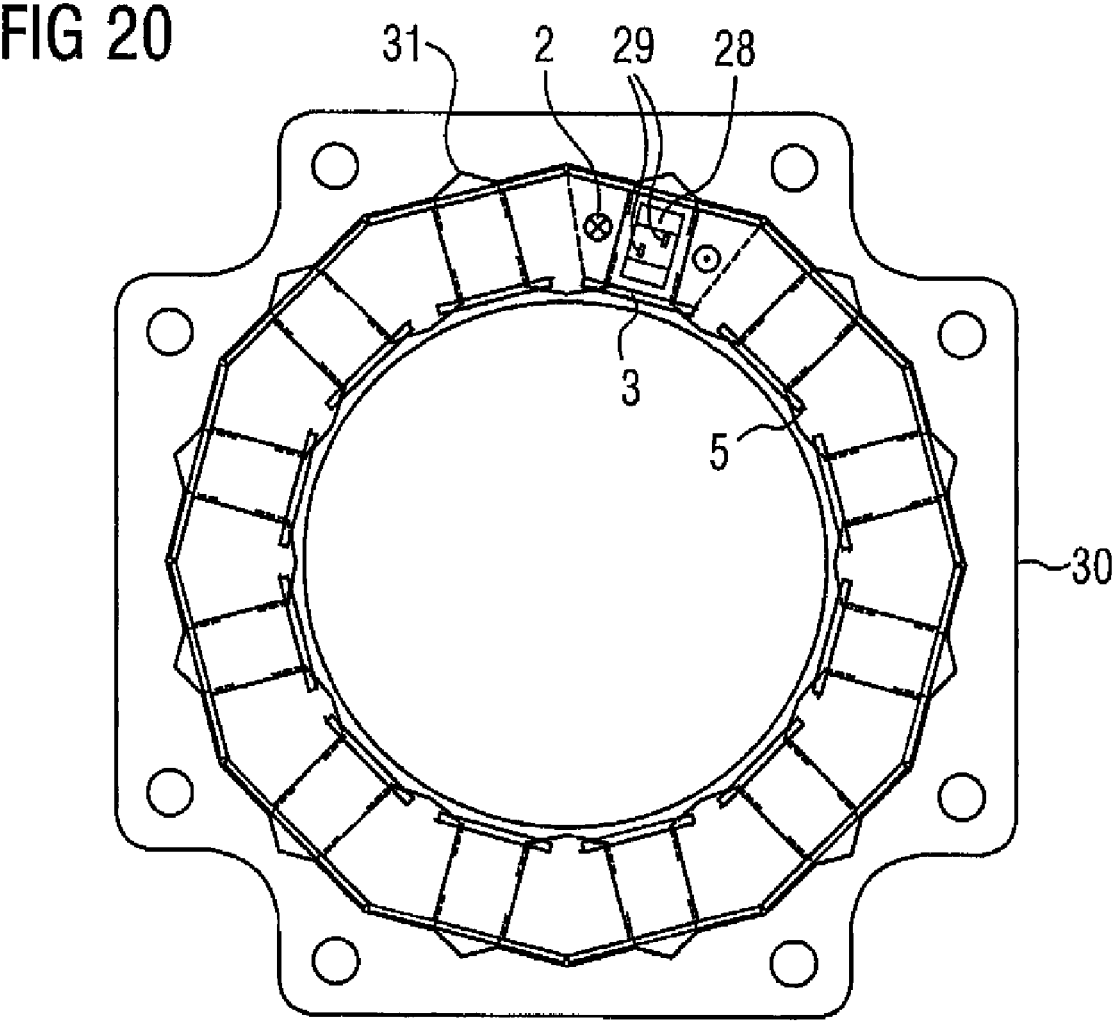
FIG. 20 shows an assembled stator.

Advantageously, an electric machine 1 can be constructed by applying the toothed coil 2 on a support 3 and by contacting the start and the end of the winding strands 23 according to FIGS. 16 and 17 on attachment points 27 and terminal contacts 29 disposed on a contact support 28. The contact support 28 includes integrally formed contours, such as slots or domes, which serve as attachment points 27 for the respective winding strands 23. As seen in FIG. 20, a circuit support 7 according to the invention, in particular a circuit support configured as a printed circuit board, can be placed on the terminal contacts 29 of the toothed coil 2 which protrude from the end face in the axial direction. Electric contacts can be made via welded, soldered, clamped, plug or crimp connections. As shown schematically in FIGS. 14 and 15, additional functional elements located on the printed circuit board can be contacted using the aforementioned types of connections.

The aforementioned individual components of the electric machine can be further mechanically secured and electrically contacted by at least partially impregnating the components with a resin.

Moreover, additional optional elements of the electric machine 1, such as brakes 22, converters, control components, etc., can be positioned, so that the electric machine can be easily assembled automatically.

What is claimed is:

1. An electric machine comprising:
   a rotor,
   a stator having at least one winding system constructed of a plurality of coils, each coil having winding strands with ends,
   at least one circuit support disposed on an end face of the stator and formed as a printed circuit board having formed thereon channels with printed conductor tracks interconnecting the winding strands in the channels in a predetermined wiring pattern and webs arranged between the conductor tracks for separating electrical potentials and lengthening leakage paths between different phases, the at least one circuit support further comprising snap-on connections engaging with the stator and securing the at least one circuit support on the stator, and a cover having webs meshing with corresponding webs of the at least one circuit support and holding the winding strands down in the channels and maintaining the leakage paths between the different phases.

2. The electric machine of claim 1, wherein the stator comprises a plurality of teeth and the winding system comprises toothed coils, and wherein each of the toothed coils surrounds a corresponding tooth of the stator.

3. The electric machine of claim 2, further comprising a support positioned on a corresponding tooth, with each of the toothed coils being arranged on a corresponding support.

4. The electric machine of claim 1, wherein the stator comprises a sheet metal laminate, and wherein the at least one circuit support is positioned on at least several of the supports or on at least several toothed coils or on a sheet metal laminate of the stator.

5. The electric machine of claim 1, wherein the at least one circuit support further includes functional elements for attaching, contacting, and routing wires of current-carrying elements.

6. The electric machine of claim 1, wherein the circuit support is formed as a single piece.

7. The electric machine of claim 5, wherein the circuit support is formed of several pieces adapted for insertion of the functional elements.

8. The electric machine of claim 1, wherein the circuit support provides interconnectability in one or several wiring planes.

9. The electric machine of claim 1, wherein the circuit support comprises one or more temperature sensors.

10. The electric machine of claim 1, wherein the circuit support is produced as an injection molded plastic part.

11. The electric machine of claim 1, wherein the circuit support is produced in MID (Molded Interconnected Device) technology or lead-frame technology.

12. The electric machine of claim 1, wherein the cover includes means for attaching the winding strands.

13. The electric machine of claim 1, wherein the cover includes a strain relief for power supply lines.

14. The electric machine of claim 1, wherein the circuit support is configured to accommodate different predetermined wiring patterns.

15. The electric machine of claim 3, wherein the support of the toothed coils includes at least one contact support for contacting the ends of the winding strands.

16. The electric machine of claim 15, wherein the at least one contact support is attached to the support of the toothed coils.

17. A method for producing an electric machine with a stator and a rotor, comprising the steps of:

providing a stamped lamination for at least one of the stator and the rotor, inserting a winding system constructed of a plurality of toothed coils into slots in the lamination of the stator or rotor, providing at least one circuit support to interconnect end portions of winding strands of the coils, with the circuit support formed as a printed circuit board having formed thereon channels with printed conductor tracks interconnecting the winding strands in the channels in a predetermined wiring pattern and webs arranged between the conductor tracks for separating electrical potentials and lengthening leakage paths between different phases, the at least one circuit support further comprising snap-on connections engaging with the stator and securing the at least one circuit support on the stator, and meshing webs of a cover with corresponding webs of the at least one circuit support and holding the wiring strands down in the channels and maintaining the leakage paths between the different phases.

18. The method of claim 17, wherein each of the toothed coils is wound onto a corresponding support before being inserted into the slots.

19. The method of claim 18, further comprising the step of contacting the end portions of the winding strands with a contact support which is attached to a corresponding support.

20. The method of claim 19, wherein the contact support includes contact terminals for interconnecting the toothed coil via the circuit support.

21. The method of claim 17, wherein the inserting step comprises the step of placing the toothed coils in the slots from the side of the stator bore or, when using a split stator, radially from the outside.

* * * * *